United States Patent
Shimoda

(10) Patent No.: US 6,778,737 B2
(45) Date of Patent: Aug. 17, 2004

(54) OPTICAL WAVEGUIDE WITH SPOT SIZE CHANGING CORE STRUCTURE AND METHOD FOR MANUFACTURING THE SAME

(75) Inventor: Tsuyoshi Shimoda, Tokyo (JP)

(73) Assignee: NEC Corporation, Tokyo (JP)

(*) Notice: Subject to any disclaimer, the term of this patent is extended or adjusted under 35 U.S.C. 154(b) by 98 days.

(21) Appl. No.: 10/114,975

(22) Filed: Apr. 4, 2002

(65) Prior Publication Data

US 2002/0146205 A1 Oct. 10, 2002

(30) Foreign Application Priority Data

Apr. 5, 2001 (JP) ........................................ 2001-107428

(51) Int. Cl.[7] .............................. G02B 6/26; G02B 6/42; G02B 6/10
(52) U.S. Cl. .............................. 385/43; 385/50; 385/49; 385/129; 438/40
(58) Field of Search ................................. 385/129–132, 385/14, 49, 50, 39–43; 65/385, 386, 403, 429

(56) References Cited

U.S. PATENT DOCUMENTS 6,003,222 A 12/1999 Barbarossa .................. 385/43
2003/0044118 A1 * 3/2003 Zhou et al. ................... 385/43

FOREIGN PATENT DOCUMENTS

| JP | 11-084156 | 3/1999 |
| JP | 2000-137129 | 5/2000 |
| JP | 2000-206352 | 7/2000 |

* cited by examiner

*Primary Examiner*—Brian Healy
*Assistant Examiner*—Kevin S. Wood
(74) *Attorney, Agent, or Firm*—Foley & Lardner

(57) ABSTRACT

In a method for manufacturing an optical waveguide, a core layer is formed on a clad layer, and a stepped portion in formed in the core layer. Then, a planar layer is formed on the core layer so that the planar layer completely covers the stepped portion of the core layer. Finally, the planar layer and the core layer are etched, so that the planar layer is completely removed and the core layer is converted into a tapered core layer.

23 Claims, 6 Drawing Sheets

OPTICAL WAVEGUIDE WITH SPOT SIZE CHANGING CORE STRUCTURE AND METHOD FOR MANUFACTURING THE SAME

BACKGROUND OF THE INVENTION

1. Field of the Invention

The present invention relates to an optical waveguide with a spot size changing core structure and its manufacturing method.

2. Description of the Related Art

As the Internet has been developed, optical communication systems have been commercially in practical use. That is, one of the current optical communication systems is a 2.5 Gb/s system which can transmit the equivalent of more than 30,000 telephone lines. As the capacity of information transmission demands increases, high density wavelength multiplexing systems up to 160 wavelength levels have been commercialized.

In the above-mentioned wavelength multiplexing systems, a band combiner for combining a plurality of signal lights having different wavelengths into a single optical fiber and a band splitter for splitting a wavelength multiplexing light from a single optical fiber into a plurality of signal lights having different wavelengths are indispensable. Array waveguide gratings (AWGs) are used as band combiners and band splitters.

Generally, an array waveguide grating is constructed by a plurality of array optical waveguides each having a definite path difference, thus serving as a high-order diffraction grating. A typical array waveguide grating has a size of about 3 cm×4 cm which is encapsulated in an about 5 cm×6 cm package whose temperature is adjusted by a Peltier element. The array waveguide grating is required to be reduced in size, so that the array waveguide grating can be easily mounted on a board.

Note that other optical waveguides used in main lines as well as bidirectional access lines are also required to be reduced in size.

The size of the above-mentioned optical waveguide is dependent upon the curvature radius of the optical waveguides therein. Also, the larger the specific refractive index difference $\Delta=(n_1-n_2)/n_1$ where $n_1$ is a refractive index of a core layer and $n_2$ is a refractive index of a clad layer, the smaller the loss of light transmission. For example, in an optical waveguide whose $\Delta$ is about 0.4%, the curvature radius has be larger than 20 mm in order to reduce the loss of light transmission below 0.1 dB/cm. Also, in an optical waveguide whose $\Delta$ is about 1.2%, the curvature radius can be smaller than 3 mm in order to reduce the loss of light transmission below 0.1 dB/cm. Further, in an optical waveguide whose $\Delta$ is about 2.0%, the curvature radius has be smaller than 1.5 mm in order to reduce the loss of light transmission below 0.1 dB/cm.

On the other hand, when the difference $\Delta$ is large, the cross section of a core layer has to be reduced to satisfy the single mode condition of transmission light. As a result, the coupling loss due to the difference in spot size between the facet of an optical waveguide and an optical fiber connected thereto is increased.

Thus, in order to reduce the coupling loss due to the difference in spot size, spot size changing core structures have been suggested.

In a first prior art method for manufacturing an optical waveguide, the width of a core layer is changed while the height of the core layer is definite, to change the spot size near the facet thereof.

In the above-described first prior art method, however, although the confinement of propagation light in the width direction can be weakened, the confinement of propagation light in the thickness direction is not weakened. Therefore, if the propagation light is a circularly-polarized light, the propagation light characteristics deteriorate due to the unbalance of the propagation light in the width direction and the thickness direction.

In a second prior art method for manufacturing an optical waveguide (see: JP-A-2000-206352), a flame hydrolysis deposition (FHD) process is used to form a tapered core layer whose thickness is gradually changed.

In the above-described second prior art method, however, the FHD process is not accurate, so that the configuration of the optical waveguide in the thickness direction can not be accurately controlled.

In a third prior art method for manufacturing an optical waveguide (see: JP-A- 11-84156 (U.S. Pat. No. 6,003,222) & JP-A-2000-137129), a first core layer having a stepped portion, and a second core layer is sintered at the stepped portion of the first core layer, thus obtaining a tapered core layer in the thickness direction.

In the third prior art method, however, since there is a discrepancy between the first and second core layers even when the first and second core layers are made of the same material, propagation light reflects at the interface therebetween and the wave front of the propagation light fluctuates, so that the characteristics of propagation light deteriorate. Also, since the first and second core layers have to be melted at a sintering process, the material of the core layers is limited. For example, a high melting point material such as SiON having a high refractive index cannot be used, and accordingly, the reduction of the optical waveguide in size cannot be expected.

SUMMARY OF THE INVENTION

It is an object of the present invention to provide a method for manufacturing an optical waveguide capable of improving the characteristics of propagation light and reducing the size.

According to the present invention, in a method for manufacturing an optical waveguide, a core layer is formed on a clad layer, and a stepped portion is formed in the core layer. Then, a planar layer is formed on the core layer so that the planar layer completely covers the stepped portion of the core layer. Finally, the planar layer and the core layer are etched, so that the planar layer is completely removed and the core layer is converted into a tapered core layer.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENT

An embodiment of the method for manufacturing an optical waveguide according to the present invention will be now explained with reference to FIGS. 1A through 1E.

Figure 1A:
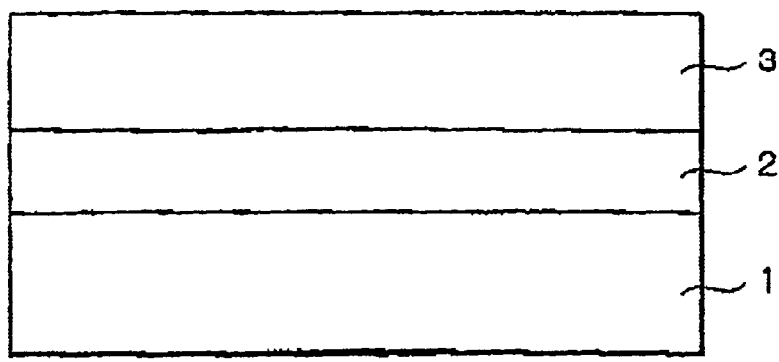
FIGS. 1A through 1E are cross sectional views for explaining an embodiment of the method for manufacturing an optical waveguide according to the present invention.

First, referring to FIG. 1A, a substrate 1 made of silicon, quartz glass or ceramic is prepared. Then, an about 5 to 20 μm thick lower clad layer 2 and an about 2 to 10 μm thick core layer 3 made of quartz glass are sequentially deposited on the substrate 1 by a chemical vapor deposition (CVD) process, a flame hydrolysis deposition (FHD) process or a sputtering process. In this case, at least one of phosphorus, boron germanium, titanium, fluorine, arsenic, aluminum and nitrogen can be introduced into the lower clad layer 2 and the core layer 3, so that the refractive index of the core layer 3 is made larger than that of the lower clad layer 2.

Figure 1B:
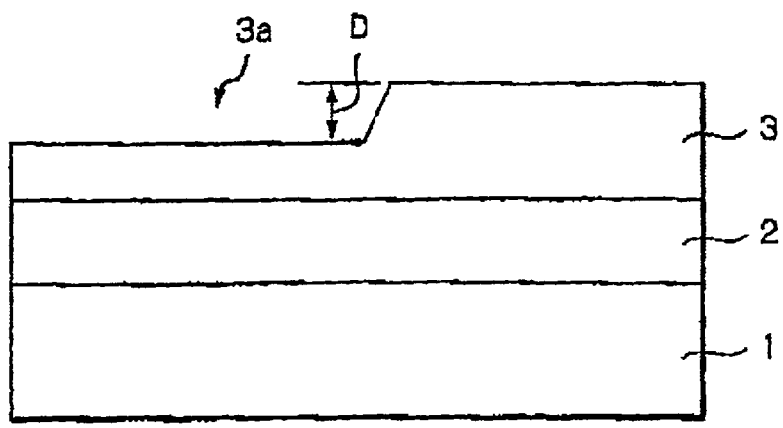

Next, referring to FIG. 1B, a stepped portion 3a having a depth D of about 1 to 9 μm is formed in the core layer 3 by a photolithography and dry etching process using a reactive ion etching (RIE) process or a photolithography and wet etching process using buffered fluoric acid.

Figure 1C:
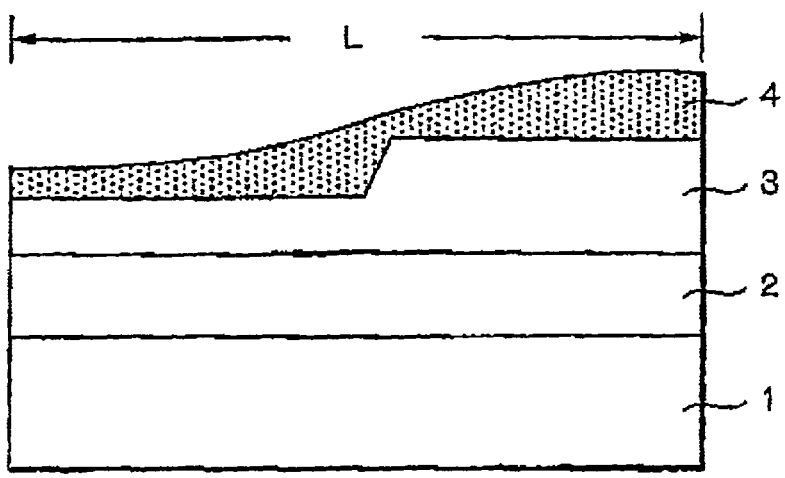

Next, referring to FIG. 1C, a planar layer 4 having a thickness larger than the depth D of the stepped portion 3a of the core layer 3 is formed on the core layer 3. For example, the planar layer 4 is formed by depositing impurity-doped quartz glass such as boron phosphorus silica glass (BPSG) which is then reflown by an annealing process. Note that the impurity doped in the quartz glass can include one or more of phosphorus, boron, germanium, titanium, fluorine, arsenic and aluminum. Also, the planar layer 4 is formed by a spin-on-glass or an energy setting polymer such as a thermosetting resin or an optisetting resin, which would be deposited by a simpler process. The material of the planar layer 4 is selected from the above-mentioned materials in view of the depth D of the stepped portion 3a of the core layer 3 and the length L of the tapered portion.

Figure 1D:
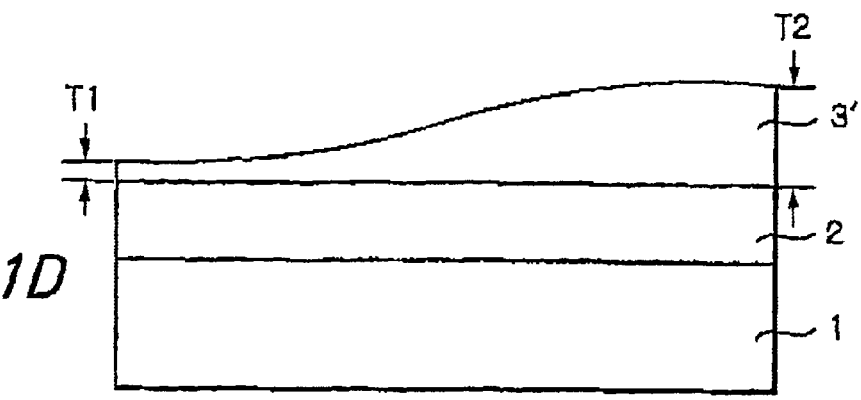

Next, referring to FIG. 1D, a dry etching process such as an RIE process is performed upon the entire surface. As a result, since the planar layer 4 and the core layer 3 have substantially the same etching rate for the dry etching process, the planar layer 4 is completely removed, and simultaneously, the core layer 3 is converted into a tapered core layer 3'. Then, the tapered core layer 3' is patterned by a photolithography and dry etching process using an RIE process, so that the width of the tapered core layer 3' has a predetermined size.

Note that the thicknesses T1 and T2 of the tapered portion of the tapered core layer 3' can be accurately controlled by the dry etching process. For example, if the dry etching process is an RIE process, the accuracy of the thickness T1 and T2 are on the order of sub μm.

Figure 1E:
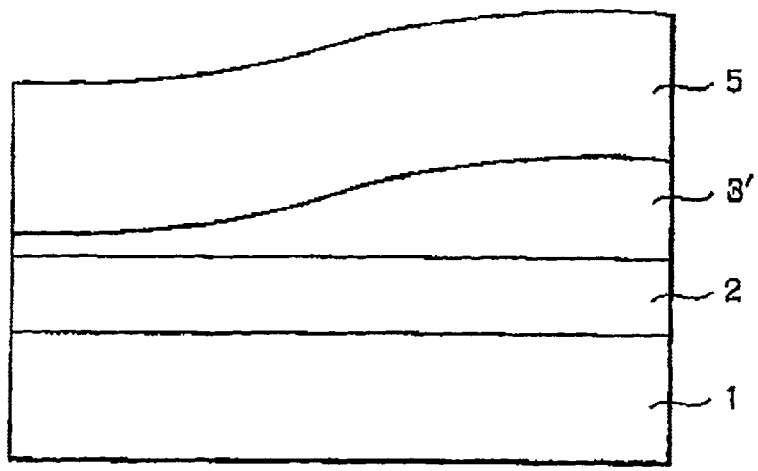

Finally, referring to FIG. 1E, an upper clad layer 5 made of quartz glass having a refractive index smaller than that of the tapered core layer 3' are deposited on the tapered core layer 3' by a CVD process, an FHD process or a sputtering process. In this case, at least one of phosphorus, boron germanium, titanium, fluorine, arsenic, aluminum and nitrogen can be introduced into the upper clad layer 5 so that the refractive index of the upper clad layer 5 is made smaller than that of the tapered core layer 3'. Note that the clad layers 2 and 5 are preferably made of the same material having the same refractive index.

Figure 2:
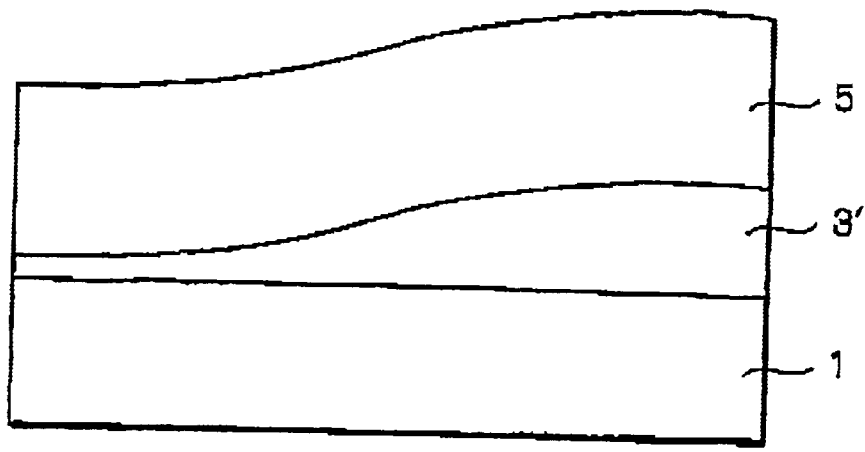
FIG. 2 is a cross sectional view illustrating a modification of the optical waveguide of FIG. 1E.

In the above-described embodiment, if the substrate 1 is made of quartz glass, the lower clad layer 2 can be omitted as illustrated in FIG. 2 which corresponds to FIG. 1E.

In the above-described embodiment, as stated above, the material of the planar layer 4 is selected in view of only the depth D of the stepped portion 3a and the length L of the tapered portion of the tapered core layer 3'. Therefore, it is unnecessary that the material of the planar layer 4 is matched with the material of the tapered core layer 3', which would increase the selectivity of the material of the tapered core layer 3'. For example, the higher the melting point of the tapered core layer 3', the higher the reproducibility of the tapered configuration thereof. Therefore, the tapered core layer 3' is preferably made of a material having a melting point higher than about 1200° C., preferably, 1300° C. Such a material is quartz glass or nitrogen-doped quarts glass such as SiON-doped quartz glass. Note that the latter material is preferable ill view of down-sizing, since nitrogen-doped quartz glass has a high refractive index.

Further, in the above-described embodiment, the length L of the tapered portion of the tapered core layer 3' is determined by the viscosity and thickness of the planar layer 4 and the depth D of the stepped portion 3a. For example, if the planar layer 4 was made of BPSG having 4.5 wt % of phosphorus and 5.8 wt % of boron, the thickness of the planar layer 4 was 3 μm and the depth D was 2 μm, the length L of the tapered portion was 70 μm by performing an annealing operation at 850° C. upon the planar layer 4. Also, if the planar layer 4 was made of BPSG having 4.5 wt % of phosphorus and 5.8 wt % of boron, the thickness of the planar layer 4 was 5 μm and the depth D was 2 μm, the length L of the tapered portion was 400 μm by performing an annealing operation at 1100° C. upon the planar layer 4. Generally, the larger the thickness of the planar layer 4, the larger the length L. Also, the higher the annealing operation, the larger the length L.

Figure 3:
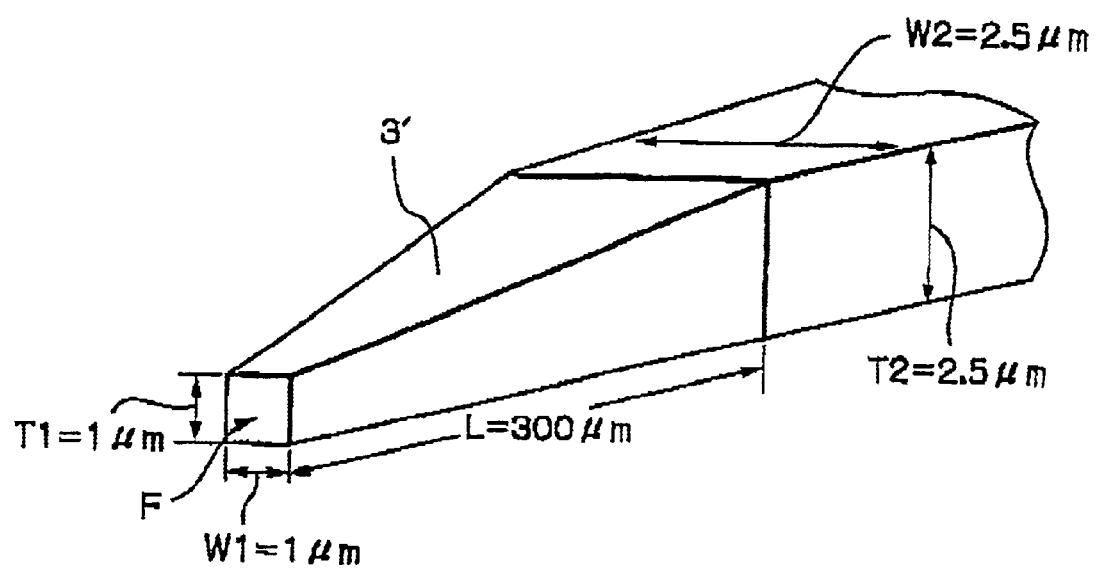
FIG. 3 is a perspective view illustrating a first example of the tapered core layer obtained by the method as illustrated in FIGS. 1A through 1E.

A first example of the tapered core layer 3' is illustrated in FIG. 3. In FIG. 3, F designates a facet with which an optical glass fiber will be in contact.

The tapered core layer 3' of FIG. 3 is manufactured as follows. A 10 μm thick lower clad layer 2 made of silicon oxide and a 4 μm thick core layer 3 made of SiON are sequentially deposited on a silicon substrate 1 by a plasma CVD process. Then, an annealing operation is carried out under an oxygen atmosphere at 900° C. for three hours. Next, a 1.5 μm deep stepped portion 3a is formed in the core layer 3 by a photolithography and RIE process. Next, a 3 μm thick planar layer 4 made of BPSG having 4.5 wt % of phosphorus and 5.8 wt % of boron is formed on the core layer 3 by a plasma CVD process. Then, an annealing operation is carried out under an oxygen atmosphere at 1000° C. for three hours, thus reflowing the planar layer 4. Next, an RIE process is performed upon the entire surface, so that a 4.5 μm of the optical waveguide in the thickness direction is etched. As a result, a tapered core layer 3' having a thickness T1 of 1 μm, a thickness T2 of 2.5 μm and a length L of 300 μm is obtained. Next, the tapered core layer 3' is patterned by a photolithography and RIE process, so that the tapered core layer 3' has a width W1 of 1 μm and a width W2 of 2.5 μm. Finally, an upper clad layer 6 is formed by a plasma CVD process, and an annealing operation is carried out under an oxygen atmosphere at 900° C. for three hours.

Thus, an optical waveguide having a smoothly-tapered spot size changing section which is gradually increased from the facet F to the inside is obtained.

In the tapered core layer 3' as illustrated in FIG. 3, the thickness T1 and the width W1 at the facet F are both decreased to weaken the confinement of propagation light, thus substantially increasing the spot size at the facet F. In this case, the spot size is gradually increased by radiation so that the efficiency of conversion of the spot size is large. However, the tolerance of propagation light in the propagation direction is small, and the characteristics of the optical waveguide of FIG. 3 are subject to the fluctuation of refractive indexes of the tapered core layer 3' and the clad layers 2 and 5 and the cleaved portion of the optical waveguide of FIG. 3.

Figure 4:
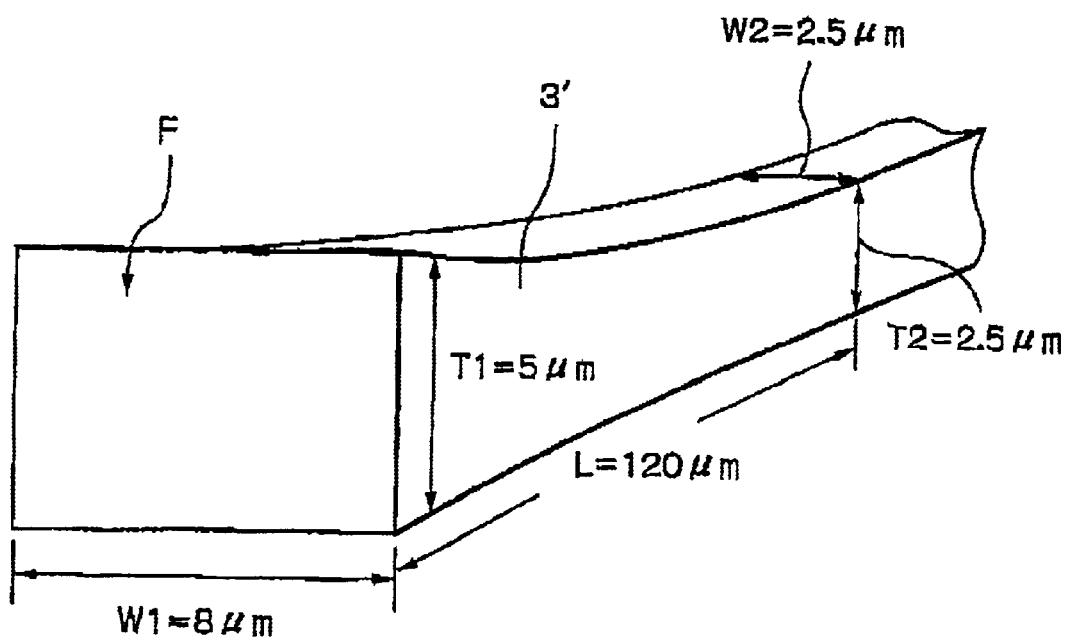
FIG. 4 is a perspective view illustrating a second example of the tapered core layer obtained by the method as illustrated in FIGS. 1A through 1E.

A second example of the tapered core layer 3' is illustrated in FIG. 4. In FIG. 4, F also designates a facet with which an optical glass fiber will be in contact.

The tapered core layer 3' of FIG. 4 is manufactured as follows. A 10 μm thick lower clad layer 2 made of silicon oxide and a 7.5 μm thick core layer 3 made of SiON are sequentially deposited on a silicon substrate 1 by a plasma CVD process. Then, an annealing operation is carried out under an oxygen atmosphere at 900° C. for three hours. Next, a 2.5 μm deep stepped portion 3a is formed in the core layer 3 by a photolithography and RIE process. Next, a 5 μm thick planar layer 4 made of BPSG having 4.5 wt % of phosphorus and 5.8 wt % of boron is formed on the core layer 3 by a plasma CVD process. Then, an annealing operation is carried out under an oxygen atmosphere at 1000° C. for three hours, thus reflowing the planar layer 4. Next, an RIE process is performed upon the entire surface, so that 7.5 μm of the optical waveguide in the thickness direction is etched. As a result, a tapered core layer 3' having a thickness T1 of 5 μm, a thickness T2 of 2.5 μm and a length L of 120 μm is obtained. Next, the tapered core layer 3' is patterned by a photolithography and RIE process, so that the tapered core layer 3' has a width W1 of 8 μm and a width W2 of 2.5 μm. Finally) an upper clad layer 6 is formed by a plasma CVD process, and an annealing operation is carried out under an oxygen atmosphere at 900° C. for three hours.

Thus, an optical waveguide having a smoothly-tapered spot size changing section which is gradually decreased from the facet F to the inside is obtained.

In the tapered core layer 3' as illustrated in FIG. 4, since the thickness T1 and the width W1 at the facet F is increased, the problems as stated in the tapered core layer 3' as illustrated in FIG. 3 are not present. However, when the spot size at the facet F is required to be very large, although the width W1 at the facet F can be easily increased by the photolithography and RIE process, it is difficult to increase the thickness T1 at the facet F while maintaining the smoothly-tapered configuration of the tapered core layer 3'.

Figure 5:
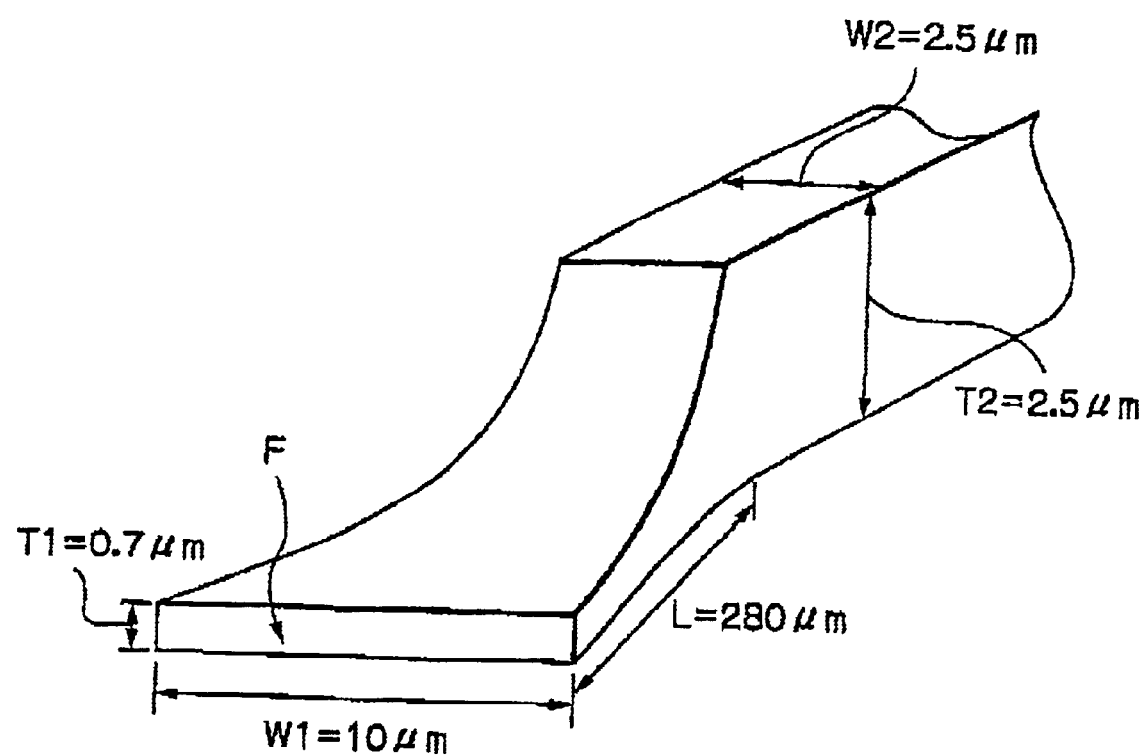
FIG. 5 is a perspective view illustrating a third example of the tapered core layer obtained by the method as illustrated in FIGS. 1A through 1E.

A third example of the tapered core layer 3' is illustrated in FIG. 5. In FIG. 5, F also designates a facet with which an optical glass fiber will be in contact.

The tapered core layer 3' of FIG. 5 is manufactured as follows. A 10 μm thick lower clad layer 2 made of silicon oxide and a 4.5 μm thick core layer 3 made of SiON are sequentially deposited on a silicon substrate 1 by a plasma CVD process. Then, an annealing operation is carried out under an oxygen atmosphere at 900° C. for three hours. Next, a 1.8 μm deep stepped portion 3a is formed in the core layer 3 by a photolithography and RIE process. Next, a 3 μm thick planar layer 4 made of BPSG having 4.5 wt % of phosphorus and 5.8 wt % of boron is formed on the core layer 3 by a plasma CVD process. Then, an annealing operation is carried out under an oxygen atmosphere at 1000° C. for three hours, thus reflowing the planar layer 4. Next, an RIE process is performed upon the entire surface, so that a 5 μm of the optical waveguide in the thickness direction is etched. As a result, a tapered core layer 3' having a thickness T1 of 0.7 μm, a thickness T2 of 2.5 μm and a length L of 280 μm is obtained. Next, the tapered core layer 3' is patterned by a photolithography and RIE process, so that the tapered core layer 3' has a width W1 of 10 μm and a width W2 of 2.5 μm. Finally, an upper clad layer 6 is formed by a plasma CVD process, and an annealing operation is carried out under an oxygen atmosphere at 900° C. for three hours.

Thus, an optical waveguide having a smoothly-tapered spot size changing section in which the thickness is gradually increased and the width is gradually decreased from the facet F to the inside is obtained.

In the tapered core layer 3' as illustrated in FIG. 5, since the thickness T1 at the facet F is decreased and the width W1 at the facet F is increased, the problems as stated in the tapered core layer 3' as illustrated in FIG. 3 or FIG. 4 are not present. That is, the thickness T1 at the facet F is decreased to weaken the confinement of propagation light, thus substantially increasing the spot size at the facet F while preventing the propagation light from being radiated. On the other hand, the width W1 at the facet F is increased to increase the spot size at the facet F. Thus, the manufacturing tolerance of FIG. 5 can be improved as compared with that of FIG. 3 and the efficiency of conversion of the spot size of FIG. 5 can be enhanced as compared with that of FIG. 4.

As explained hereinabove, according to the present invention, since the tapered core layer is constructed by a single layer, the reflection of propagation light and the distortion of wave front can be suppressed. Also, since there is no limit in the material of the tapered core layer, the accuracy of the optical waveguide can be enhanced.

What is claimed is:

1. A method for manufacturing an optical waveguide, comprising the steps of:
   forming a single core layer on a clad layer;
   forming a stepped portion in said core layer;
   forming a planar layer on said core layer so that said planar layer completely covers the stepped portion of said core layer; and
   etching said planar layer and said core layer, so that said planar layer is completely removed and said core layer is converted into a tapered core layer.

2. The method as set forth in claim 1, wherein said etching process is a dry etching process.

3. The method as set forth in claim 2, wherein said dry etching process is a reactive ion etching process.

4. The method as set forth in claim 1, further comprising a step of forming said clad layer on a substrate before said core layer is formed on said clad layer.

5. The method as set forth in claim 1, wherein said tapered core layer has a thickness which is gradually increased from a facet of said optical waveguide to the inner side thereof.

6. The method as set forth in claim 1, wherein said tapered core layer has a thickness which is gradually decreased from a facet of said optical waveguide to the inner side thereof.

7. The method as set forth in claim 1, further comprising a step of patterning said tapered core layer so that the width of said tapered core layer is gradually changed.

8. The method as set forth in claim 7, wherein said patterning step uses a photolithography and dry etching process.

9. The method as set forth in claim 7, wherein said tapered core layer has a thickness which is gradually increased from a facet of said optical waveguide to the inner side thereof and has a width which is gradually increased from the facet of said optical waveguide to the inner side thereof.

10. The method as set forth in claim 7, wherein said tapered core layer has a thickness which is gradually decreased from a facet of said optical waveguide to the inner side thereof and has a width which is gradually decreased from the facet of said optical waveguide to the inner side thereof.

11. The method as set forth in claim 7, wherein said tapered core layer has a thickness which is gradually increased from a facet of said optical waveguide to the inner side thereof and has a width which is gradually decreased from the facet of said optical waveguide to the inner side thereof.

12. The method as set forth in claim 4, wherein said substrate is made of one of silicon, quartz glass and ceramic.

13. The method as set forth in claim 1, wherein said clad layer and said core layer are made of quartz glass.

14. The method as set forth in claim 1, wherein said clad layer and said core layer are made of quartz glass into which at least one of phosphorus, boron, germanium, titanium, fluorine, arsenic, aluminum and nitrogen are introduced.

15. A method for manufacturing an optical waveguide, comprising the steps of:

forming a core layer on a clad layer;

forming a stepped portion in said core layer;

forming a planar layer on said core layer so that said planar layer completely covers the stepped portion of said core layer; and etching said planar layer and said core layer, so that said planar layer is completely removed and said core layer is converted into a tapered core layer;

wherein said planar layer forming step comprises the steps of:

forming an impurity-doped quartz glass layer on said core layer; and reflowing said impurity-doped quartz glass layer to form said planar layer.

16. The method as set forth in claim 15, wherein said impurity-doped quartz glass layer includes at least one of phosphorus, boron, germanium, titanium, fluorine, arsenic, aluminum and nitrogen.

17. The method as set forth in claim 1, wherein said planar layer is made of a spin-on-glass.

18. The method as set forth in claim 1, wherein said planar layer is made of an energy setting polymer.

19. The method as set forth in claim 18, wherein said energy setting polymer is a thermosetting resin.

20. The method as set forth in claim 18, wherein said energy setting polymer is a optisetting resin.

21. A method for manufacturing an optical waveguide, comprising the steps of:

forming a single core layer on a clad layer;

forming a stepped portion in said core layer;

forming a planar layer on said core layer so that said planar layer completely covers the stepped portion of said core layer; and etching said planar layer and said core layer, by a dry etching process, so that said planar layer is completely removed and said core layer is converted into a tapered core layer whose thickness is gradually changed.

22. An optical waveguide made by the process of claim 1.

23. An optical waveguide made by the process of claim 21.

* * * * *